UNITED STATES PATENT OFFICE.

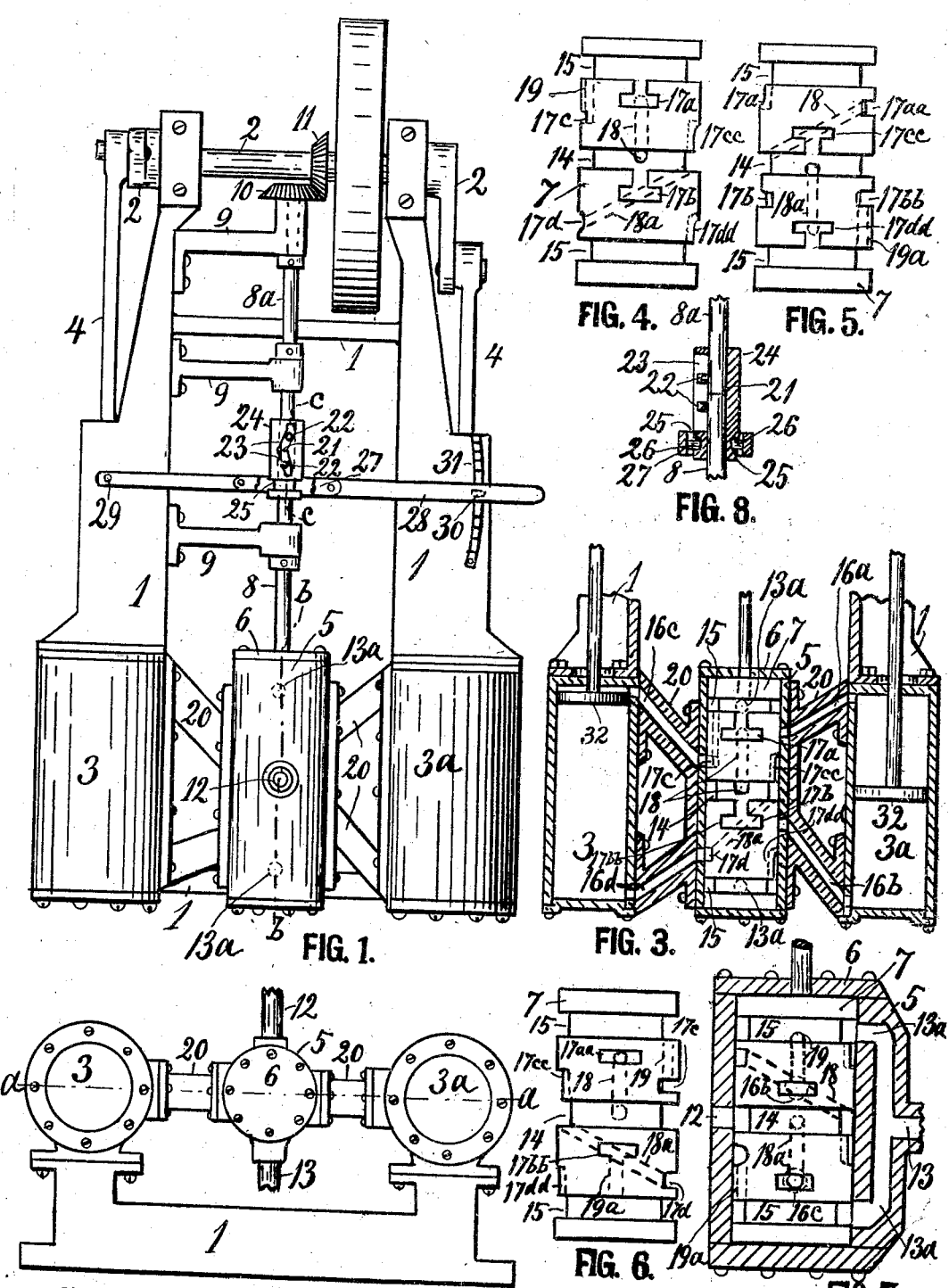

OLE HOLEN, JR., OF BRITTON, SOUTH DAKOTA.

VALVE AND VALVE-GEAR FOR STEAM-ENGINES.

No. 891.255.

Specification of Letters Patent.  Patented June 23, 1908.

Application filed February 8, 1907. Serial No. 356,367.

*To all whom it may concern:*

Be it known that I, OLE HOLEN, Jr., a citizen of the United States, residing at Britton, in the county of Marshall and State of South Dakota, have invented certain new and useful Improvements in Valves and Valve-Gears for Steam-Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to valves and valve gears for steam engines; and the object is to provide and so improve and simplify the same that a reversible engine with two cranks on its shaft and a double-acting cylinder operating each crank, will need but one single valve to regulate both inlet and exhaust. This object I attain by the novel construction and arrangement of parts illustrated in the accompanying drawing, in which—

Figure 1 is top or plan view of an engine provided with my improved valve and valve gear. Fig. 2 is an end elevation of Fig. 1. Fig. 3 is a sectional plan view on the line $a\,a$ in Fig. 2. Fig. 4 is an enlarged view of the valve plug in the same position as in Fig. 3. Fig. 5 is a right side view of Fig. 4. Fig. 6 is a right side of Fig. 5. Fig. 7 is a right side view of Fig. 6 with the valve shell or chamber in vertical section on the line $b\,b$ in Fig. 1. Fig. 8 is an enlarged vertical sectional view on the line $c\,c$ in Fig. 1.

Referring to the drawing by reference numerals, 1 designates the frame, 2 the crank shaft, and 4 the connecting rods or pitmen of an engine with two double acting cylinders 3 and $3^a$. Between said cylinders and communicating with their interior is mounted a cylindrical valve shell or casing 5, which may or may not have its ends closed by covers 6. In said valve casing is fitted to rotate snugly a cylindrical valve plug 7, which in Figs. 4, 5, 6, and 7 is shown from four different sides. In the valve is fixed a long stem or shaft 8—$8^a$, which is journaled in bearings 9 and is rotated by a miter-gear 10 fixed on it and another miter gear 11 meshing therewith and fixed on the crank-shaft 2, so that each turn of the crank shaft imparts one turn to the valve. As the valve is thus revolved the live steam enters through inlet 12 and exhausts at the opposite side of the valve shell at 13, where it is gathered from ports or ducts $13^a$ (see Fig. 7), after circulating to and from the cylinders through the various ducts and ports in the valve. Said circulation of the steam will follow when the valve and its shell are made as illustrated, and the same can be better understood by an engineer or an engine builder looking at the drawing than it can be described, still the following description may render some help to an understanding of the construction.

The valve 7 is a solid cylindrical body in which are formed at the middle a peripherical groove 14 for the live steam pouring in through pipe 12, and near each end is a similar groove 15 for the exhaust steam to reach the ports $13^a$.

Adapted to register with the ports $16^a$, $16^b$, $16^c$, and $16^d$ of the cylinders, the valve is provided with four peripherical rows of ports, each row containing two diametrically opposite ports $17^a$, $17^{aa}$, $17^b$, $17^{bb}$, $17^c$ and $17^{cc}$.

18 is a diagonal duct or extension of port $17^{aa}$ into the groove 14, and $18^a$ is a similar duct from port $17^d$ into the groove 14, while 19 and $19^a$ are longitudinal ducts from ports $17^c$ and $17^{bb}$, respectively, into the groove 15. The two diagonal ducts stand in transverse diametrical planes to each other, and the longitudinal ducts 19 and $19^a$ are arranged each in longitudinal line with one of the ports $17^d$ and $17^{aa}$. Now, as the valve is revolved it will be seen that the live steam has a chance to enter the opposite ends of both cylinders in the proper order for driving the engine in the usual manner, and return and exhaust through the various ports described, as will be still further described later on.

The cut-off and expansion of the steam may be regulated by the size of the openings of each port at the surface of the valve plug in peripherical direction of the plug.

The abutments 20 may be of any suitable form and may be cast integral with either the valve shell or the cylinders.

The valve rod is divided at 21 into two sections 8 and $8^a$, which are near the abutting ends provided each with a radial pin 22, which are guided in a V-shaped or double slanting side slot 23 of a slidable coupling 24, which embraces the rod and has an annular groove 25 engaged by studs 26 in a yoke 27 formed on a lever 28, which is pivoted at 29 and has a tooth 30 adapted to engage any of the notches of a notched sector or rack 31. When the lever 28 is placed at one end of the rack the engine will run one way, and when placed at the other end of the rack the member 24 will act on the pins 22 and impart one fourth of a turn to the valve plug without turning the gear 10, and the engine will be reversed. It will be observed that the slot in member 24 is slanting from the middle toward both ends in opposite direction or at an obtuse angle, whereby the necessary sliding of the member is reduced to a minimum.

When the engine is running at full speed one of the pins 22 is at the middle of the slot and the other in the end of it, both of which places are without slanting so as to afford good holds for the pins. When the lever is at the middle of the rack 31 the engine will stop as the ports in the valve-shell are closed by the plug, and if the engine stirs at all the steam will soon be equalized on all sides of the pistons 32. The speed of the engine may also be reduced by moving the lever more or less toward the middle of the rack so that the solid face of the valve will more or less cover the steam ports of the cylinders at the time they would normally be open to allow full action of the steam on the pistons.

In further describing the circulation of the steam it will be seen that when the engine is run in one direction the front end of the cylinder $3^a$ receives steam through valve port $18$—$17^{aa}$ and exhausts through valve port $17^a$, while the rear end of the cylinder receives steam through port $17^b$ and exhausts through port $17^{bb}$; and the cylinder 3 receives the steam into its front end by port $17^{cc}$, and exhausts it by port $17^c$, while the rear end receives steam by the port $18^a$—$17^d$, and exhausts by port $17^{dd}$. Hence it is evident that when the valve is given one-half of a turn the steam instead of entering the front end of the cylinder $3^a$ at $17^{aa}$ enters the rear end at $17^d$, and as all the ports on the valve change position to the same extent as those two just mentioned it is readily understood that the reversion of the engine must follow.

What I claim is:—

In a steam engine, a rotary valve having an annular groove near the middle and one near each end, and between the middle groove and each end groove upon each of two different peripherical lines a pair of diametrically opposite ports, each port in the two pairs being situated about ninety degrees from the nearest port in the other pair; said ports opening, one diagonally through the valve into the annular groove at the middle, another and opposite one extending longitudinally along the face of the valve into the annular groove near the end of the valve, the third port extending, open as a canal into the annular groove at the middle of the valve, and the opposite port extending below the surface of the valve longitudinally into the annular groove near the end of the valve; a shell, chamber or casing encircling said valve and having steam ports registering with the three annular grooves, and two pairs of ports, each port adapted to register alternately with the opposite ports of a pair in the valve, and thus conduct steam to and from a pair of double acting steam cylinders, and means for rotating the valve by the rotation of the engine shaft.

In testimony whereof I affix my signature, in presence of two witnesses.

OLE HOLEN, JR.

Witnesses:
  E. A. COOPER,
  LOUIS GUARVE.